United States Patent [19]
Denker et al.

[11] Patent Number: 5,271,885
[45] Date of Patent: Dec. 21, 1993

[54] METHOD FOR FABRICATING INTERIOR LININGS FOR MOTOR VEHICLES

[75] Inventors: Ernst Denker, Westerkappeln; Gerhard Reisinger, Egling, both of Fed. Rep. of Germany

[73] Assignee: BASF Aktiengesellschaft, Ludwigshafen, Fed. Rep. of Germany

[21] Appl. No.: 845,286

[22] Filed: Mar. 3, 1992

[51] Int. Cl.$^5$ .............................................. B29C 67/22
[52] U.S. Cl. ........................... 264/46.5; 264/46.6; 264/257
[58] Field of Search ............. 264/46.5, 257, 258, 264/46.4, 46.6

[56] References Cited

U.S. PATENT DOCUMENTS

| | | | |
|---|---|---|---|
| 3,989,781 | 11/1976 | Chant | 264/46.5 |
| 4,130,614 | 12/1978 | Saidla | 264/46.5 |
| 4,474,636 | 10/1984 | Bogner | 264/258 |
| 4,714,575 | 12/1987 | Preston | 264/46.4 |
| 4,738,809 | 4/1988 | Storch | 264/46.7 |
| 4,891,081 | 1/1990 | Takahashi et al. | 264/46.7 |

FOREIGN PATENT DOCUMENTS

| | | | |
|---|---|---|---|
| 0074325 | 3/1983 | European Pat. Off. | 264/257 |
| 898242 | 6/1962 | United Kingdom | 264/46.5 |

*Primary Examiner*—Allan R. Kuhns
*Attorney, Agent, or Firm*—Dennis V. Carmen

[57] ABSTRACT

A method of producing inside linings with a skin of polyurethane material and a polyurethane support reinforced with fiberglass pour-behind foamed together in a mold. The method operates in such a fashion that the support is first produced separately from a fiberglass mat, cut to size with exact contours and dimensions relative to the finished inside lining, and saturated with polyurethane material to form a support with a protruding edge section consisting only of the polyurethane material. The polyurethane skin is inserted into a lower mold with an edge that protrudes in the separation plane of the lower mold. The separately produced polyurethane support is then inserted into the upper mold with the edge section, made only of polyurethane material, lying in the separation plane. The support and the skin are pour-behind foamed by filling the polyurethane material into the open mold. The mold is closed so that the edge section of the separately produced support in the separation plane contacts the skin and forms a seal. The mold is then opened, and the molding is taken out. If one works with a closed mold, the mold naturally is first closed; and the polyurethane material is filled into the closed mold. The edge section consisting only of polyurethane material is cut off from the end product so that the waste consists solely of recyclable polyurethane material. At the same time, the edge section forms a seal during pour-behind foaming, which prevents the polyurethane material from reaching the outside surface of the skin during pour-behind foaming.

2 Claims, 1 Drawing Sheet

METHOD FOR FABRICATING INTERIOR LININGS FOR MOTOR VEHICLES

BACKGROUND OF THE INVENTION

1. Field of the Invention

The invention relates to a method for fabricating interior linings or the like for motor vehicles, with a skin of polyurethane material and a glass fiber mat-reinforced polyurethane support, which are "pour-behind foamed" together in a mold.

2. Field of the Invention

Pour behind methods are known as a common molding technique for various designs. Supports for the interior linings can be made of various materials such as metal. The production method differs depending on the type of support.

The automobile industry is imposing ever increasing and stringent requirements on the environmental compatibility of the utilized materials and is looking to the possibility of reusing these materials. Plastic materials can be readily recycled if they consist of one single plastic or of compositions within a single plastic family. For example, the polyurethane materials that are being considered here constitute a single family, the polyurethane family.

High-grade inside linings for motor vehicles consist of a skin that is visible within the interior compartment of the vehicle, a support which takes care of form stability, and a pour behind foam between the skin and the support to achieve a soft touch.

SUMMARY OF THE INVENTION

It is now an object of the invention to create a method of the type mentioned in the introduction in which recyclable wastes are generated, consisting of only a single family of materials. It is also an object of the invention to achieve a good seal simultaneous with the pour behind foaming so that during the pour behind foaming operation, no foamed polyurethane material should reach the outside surface of the skin.

This object is achieved by separately manufacturing a support comprising a mat-reinforced polyurethane material having protruding edge sections consisting only of the polyurethane material, placing this support on an upper mold surface such that the protruding edge sections lay within the separation plane of the mold, placing a polyurethane skin with protruding edges on the lower mold surface so that the protruding edges are coincident with the protruding edge sections of the support and lay within the separation plane, and either a. pour behind foam the support and skin by filling the open mold with a polyurethane foam material and closing the mold so that the protruding edge sections of the support form a seal in contact with the protruding edges of the skin; or, b. reversing the sequence of steps in a) above and subsequently opening the mold to take the molding out.

DETAILED DESCRIPTION OF THE INVENTION

According to the invention, a support is made separately. This support consists of glass fiber mat cut to precise contours and dimension, which is saturated with polyurethane material by foam-filling. The edge section(s) protruding from the side(s) of the support contain no glass—only polyurethane material. This edge section can be cut off from the end product as waste material; and since the waste consists solely of polyurethane material, it can be recycled as such. Furthermore, this edge section forms a seal during pour behind foaming, which prevents the polyurethane foaming material from reaching the outside surface of the skin during the pour behind foaming process.

After filling the open mold by pour behind foaming, it is closed. The edge section of the previously produced support consisting solely of polyurethane material forms a seal in the separation plane of the mold. This edge section, together with the corresponding protruding edge of the skin, which likewise consists of polyurethane material, is cut off from the molded part. It is possible to reuse this waste material easily and economically. At the same time, the edge section forms a simple and effective seal.

If back-foaming takes place in a closed mold, the mold is closed before the polyurethane material is filled in. Here, the edge section of the previously produced support again forms the desired seal.

When preparing moldings according to the inventive method, the waste products are comprised of a pure type of polyurethane without glass. Glass waste results only when cutting the glass fiber mat. Furthermore, when cutting the end product, the lifetime of the cutting tool increases since only polyurethane and no glass needs to be cut.

Therefore, according to the invention, a glass fiber mat-reinforced polyurethane support is used where the dimensions of the glass fiber mats correspond to the dimensions of the finished products so that only an edge section, namely, the sealing edge, protrudes, which is fabricated solely of polyurethane material.

The invention is explained below in more detail with reference to the drawings.

Figure 1:
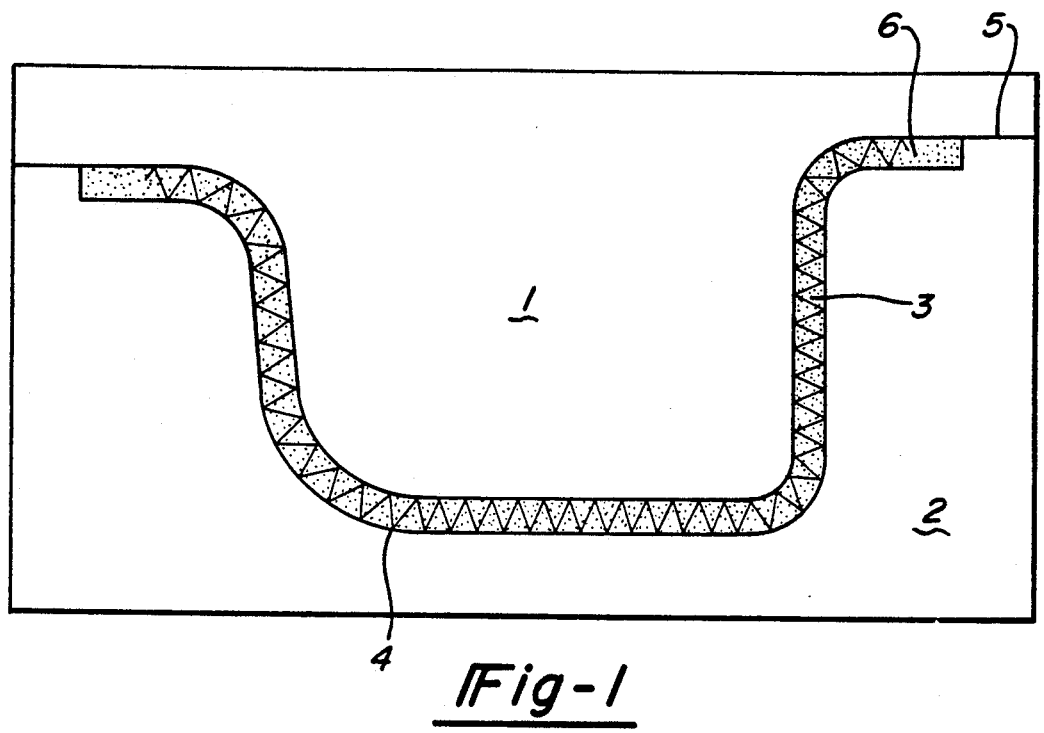
FIG. 1 illustrates a schematic cross-section of a mold for the manufacture of the glass fiber mat-reinforced polyurethane support with the protruding edge section 6 free of glass reinforcement 4.
Figure 2:
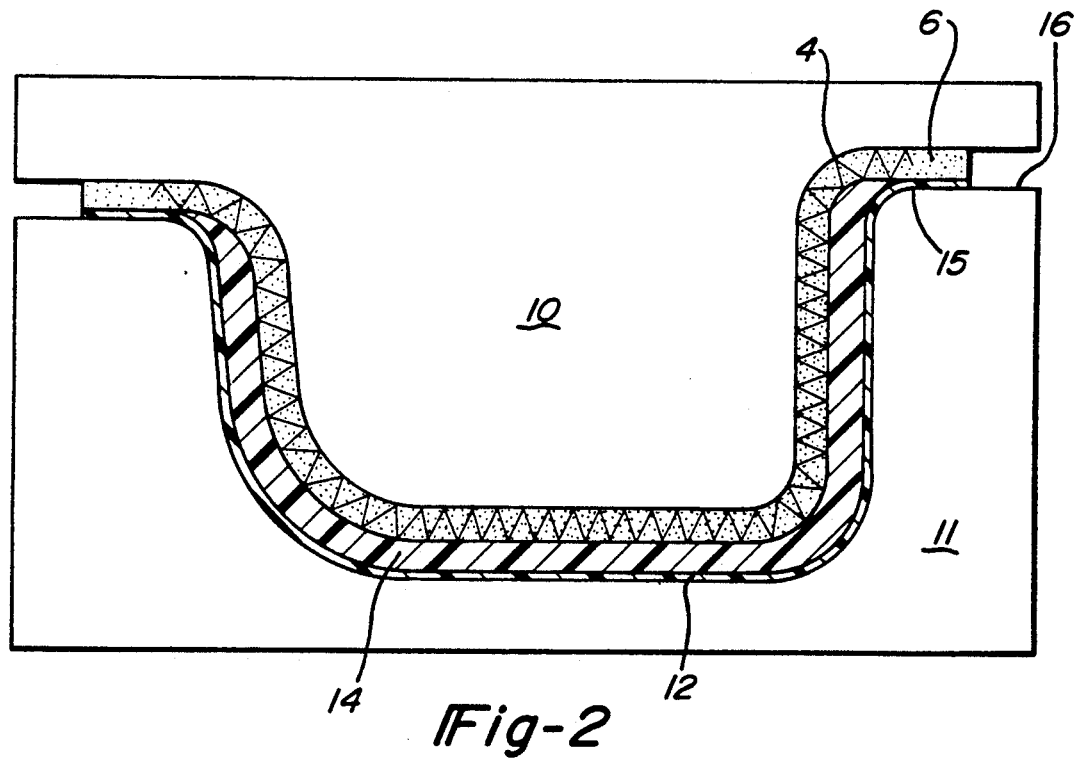
FIG. 2 shows a schematic cross-section of a mold used for the manufacture of automotive inner linings with the protruding edge section of support 6 and the protruding edge of skin 15 in sealed relation.

FIG. 1 shows a schematic cross-section through a mold for the separate production of a support, and FIG. 2 shows a schematic cross-section of a mold for producing the inside lining of a motor vehicle.

FIG. 1 shows a mold for the production of a support. The mold comprises an upper part 1 and a lower part 2. The mold cavity 3 is situated between these two parts. A glass fiber mat that is previously cut to a precise contour and dimension is inserted into this cavity. In the mold cavity, there remains sections on the edges free of the glass fiber mat. After the glass fiber mat 4 is filled with foam or saturated, an edge section 6 is produced that consists only of polyurethane material and therefore contains no glass. The separation plane for the mold is designated by 5.

The actual mold shown in FIG. 2 to produce the inside lining of motor vehicles basically has a similar structure. It consists of an upper mold 10 and a lower mold 11. The separation plane is designated by 16.

In this mold, the previously produced support 4 is inserted with its edge section 6 (containing no glass) in the mold and fastened to the upper mold 10. The skin 12, consisting of polyurethane material, is placed onto the lower mold 11. An edge 15 of the skin 12 protrudes over and coincides with the edge section 6 of the support. The edge 15 and the edge section 6 lie in the separation plane 16.

For pour behind foaming, a polyurethane material is filled into a mold that is prepared in this manner and forms the pour-behind foam 14. After being filled up, the mold is closed quickly so that the edge section 6 forms a seal preventing the polyurethane material, forming the pour-behind foam body 14 from reaching the outside of the skin 12. After hardening, the mold is opened; and the molding is taken out. The edge section 6 and the edge 15 are then separated from this molding. Both of these consist of only one material family, namely, polyurethane, and contain no glass components.

If back-foaming takes place in a closed mold, the mold is first closed; and the material to form the pour-behind foamed product 14 is introduced through a duct (not shown). In this case as in the case above, the edge section 6 forms the appropriate seal.

In principle, it is possible to cut the glass fiber mat to a precise fit and also to cut out sections from the mat corresponding to penetrations, cavities, or openings on the finished product before filling up with foam and saturating the support. The openings in the glass fiber mat are plugged with polyurethane foam during filling so that a closed support with a closed surface can be delivered for pour-behind foaming.

The closed surface of the support prevents the polyurethane foam from penetrating to the outside of the support and thus contaminating the backside of the support with foam during the pour-behind foaming operation. Consequently, no cleaning is needed. However, since a finished dashboard always has penetrations in the support area, e.g., openings for the glove box, defroster nozzles, radio, loudspeakers, etc., these openings are produced after pour-behind foaming by cutting out the polyurethane plugged sections in a manner analogous to the protruding edge cut described above.

What we claim is:

1. A method for producing finished inside linings for motor vehicles with a skin of polyurethane material and with a polyurethane support that is reinforced with a glass fiber mat, which are pour-behind foamed together in a mold comprised of a separation plane between a lower mold and an upper mold by the following process steps:
   a) separately producing the support comprised of a glass fiber mat cut to the precise contour and dimension of the desired finished inside lining, saturated with polyurethane material, said support having a protruding edge section consisting solely of this polyurethane material;
   b) inserting the skin into the lower mold, the skin having a protruding edge lying in the separation plane;
   c) inserting the separately produced support into the upper mold with said protruding edge section lying in the separation plane;
   d) pour-behind foaming the support and the skin by filling polyurethane material into the mold which is open;
   e) closing the mold so that the edge section of the separately produced support in the separation plane forms a seal in contact with the skin; and,
   f) opening the mold and taking the molding out.

2. A method for producing finished inner linings for motor vehicles with a skin of polyurethane material and a polyurethane support reinforced with a glass fiber mat, which are pour-behind foamed together in a mold comprised of a separation plane between a lower mold and an upper mold by the following process steps:
   a) separately producing a support comprised of a glass fiber mat cut to the precise contour and dimension of the desired finished inside lining, saturated with polyurethane material, said support having a protruding edge section consisting solely of this polyurethane material;
   b) inserting the skin into the lower mold, the skin having a protruding edge lying in the separation plane;
   c) inserting the separately produced support into the upper mold with said protruding edge section lying in the separation plane;
   d) closing the mold so that the edge section of the separately produced support in the separation plane forms a seal in contact with the skin;
   e) pour-behind foaming the support and the skin by filling polyurethane material into the closed mold; and, f) opening the mold and taking out the molding.

* * * * *